United States Patent
Berezhnyy et al.

(10) Patent No.: US 11,635,375 B2
(45) Date of Patent: Apr. 25, 2023

(54) LIGHT DETECTION MODULE WITH ADJUSTABLE SENSITIVITY

(71) Applicant: Becton, Dickinson and Company, Franklin Lakes, NJ (US)

(72) Inventors: Ihor V. Berezhnyy, Los Gatos, CA (US); Geoffrey W. Osborne, Los Gatos, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 251 days.

(21) Appl. No.: 17/085,278

(22) Filed: Oct. 30, 2020

(65) Prior Publication Data
US 2021/0148816 A1  May 20, 2021

Related U.S. Application Data

(60) Provisional application No. 62/938,034, filed on Nov. 20, 2019.

(51) Int. Cl.
| | |
|---|---|
| *G01N 21/53* | (2006.01) |
| *G01N 21/39* | (2006.01) |
| *G01N 21/85* | (2006.01) |

(52) U.S. Cl.
CPC ........... *G01N 21/532* (2013.01); *G01N 21/39* (2013.01); *G01N 21/85* (2013.01); *G01N 2201/06113* (2013.01)

(58) Field of Classification Search
CPC ...... G01N 21/532; G01N 21/39; G01N 21/85; G01N 2201/06113; G01N 15/1434; G01N 2015/1006; G01N 2015/149; G01N 15/1459

USPC .......................................................... 356/337
See application file for complete search history.

(56) References Cited

U.S. PATENT DOCUMENTS

| | | | |
|---|---|---|---|
| 3,960,449 A | 6/1976 | Carleton | |
| 2004/0057050 A1* | 3/2004 | Beck ................. | G01N 15/1459 356/336 |
| 2015/0111287 A1 | 4/2015 | Rawle et al. | |
| 2015/0268244 A1 | 9/2015 | Cho et al. | |
| 2017/0227447 A1 | 8/2017 | Degeal et al. | |

(Continued)

FOREIGN PATENT DOCUMENTS

| | | |
|---|---|---|
| EP | 0545315 A1 | 6/1993 |
| EP | 2522987 A1 | 11/2012 |
| WO | WO2013191772 A1 | 12/2013 |

OTHER PUBLICATIONS

Zhu, et al., 'Light-scattering detection below the level of single fluorescent molecules for high-resolution characterization of functional nanoparticles', ACS Nano, 2014, vol. 8, No. 10, pp. 10998-11006.

*Primary Examiner* — Md M Rahman
(74) *Attorney, Agent, or Firm* — Bret E. Field; Bozicevic, Field & Francis LLP

(57) ABSTRACT

Light detection systems for simultaneously measuring scattered light (e.g., in a flow stream) from particles having diameters which differ by 100 nm or more are described. Light detection systems according to certain embodiments include a static optical adjustment component, a variable optical adjustment component and a photodetector. Systems and methods for measuring scattered light from a sample (e.g., in a flow stream) and kits having a static optical adjustment component, a variable optical adjustment component and a photodetector are also provided.

18 Claims, 3 Drawing Sheets

(56) References Cited

U.S. PATENT DOCUMENTS

| | | | |
|---|---|---|---|
| 2017/0370920 A1* | 12/2017 | Akama | G01N 33/54313 |
| 2018/0059005 A1* | 3/2018 | Marshall | G01N 21/39 |
| 2018/0073974 A1 | 3/2018 | Diebold et al. | |
| 2020/0209064 A1* | 7/2020 | Owsley | G01N 21/6428 |

* cited by examiner

LIGHT DETECTION MODULE WITH ADJUSTABLE SENSITIVITY

Pursuant to 35 U.S.C. § 119 (e), this application claims priority to the filing dates of U.S. Provisional Patent Application Ser. No. 62/938,034 filed Nov. 20, 2019, the disclosure of which application is herein incorporated by reference.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. To quantify these variations, the light is collected and directed to the surface of a detector. The amount of light that reaches the detector can impact the overall quality of the optical signal outputted by the detector. The amount of light that reaches the detector can be raised by increasing the surface area of the detector or by increasing collection of the light from the sample.

One technique that utilizes light detection to characterize the components in a sample is flow cytometry. Using data generated from the detected light, distributions of the components can be recorded and where desired material may be sorted. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. Within the flow cell, a liquid sheath is formed around the cell stream to impart a substantially uniform velocity on the cell stream. The flow cell hydrodynamically focuses the cells within the stream to pass through the center of a light source in a flow cell. In some instances, light from the light source can be detected as scattered light from particles in the flow stream. The particle sizes of components (e.g., tissue pieces, extracellular components, cells, etc.) in a biological sample can vary greater depending on the source of the sample and the amount of processing of the sample before analysis by flow cytometry.

SUMMARY

Aspects of the present disclosure include light detection modules configured to simultaneously measure scattered light in a flow stream from particles having diameters which differ by 100 nm or more (e.g., differ by 500 nm or more). Light detection modules according to certain embodiments include a static optical adjustment component, a variable optical adjustment component and a light scatter detector. In some embodiments, the light scatter detector is a side scatter photodetector. In other embodiments, the light scatter detector is a forward scatter photodetector. In still other embodiments, the light scatter detector is a back scatter photodetector. In some embodiments, the static optical adjustment component includes a bandpass filter. In some embodiments, the variable optical adjustment component includes a variable neutral density filter. In other embodiments, the variable optical adjustment component includes an adjustable beam splitter. In certain embodiments, light detection modules include a plurality of light scatter photodetectors and a variable optical adjustment component that includes a plurality of adjustable beam splitters. Light detection modules of interest are, in some instances, configured to simultaneously measure scattered light from particles in a flow stream that is irradiated with a low power light source, such as a laser having a peak power output of 1 mW or less.

Aspects of the present disclosure also include systems for measuring scattered light from particles having diameters which differ by 100 nm or more. In certain embodiments, systems include a light source and a light detection module having a static optical adjustment component, a variable optical adjustment component and a light scatter detector. In some embodiments, the light source is a light beam generator that produces a plurality of frequency shifted beams of light (e.g., a first beam of radiofrequency-shifted light and a second beam of radiofrequency-shifted light). In certain instances, the light beam generator includes an acousto-optic deflector, such as an acousto-optic deflector that is operatively coupled to a direct digital synthesizer radiofrequency comb generator. In these instances, the light beam generator is configured to generate a local oscillator beam and a plurality of comb beams (e.g., radiofrequency-shifted local oscillator beam and radiofrequency-shifted comb beams). In some embodiments, the light source includes a laser, such as a continuous wave laser. In some instances, the light detection module includes a plurality of photodetectors. In certain instances, systems also include an optical collection system for propagating scattered light from the flow stream to the light detection module. The optical collection system may be a free-space light relay system or may include fiber optics such as a fiber optics light relay bundle. In some embodiments, the system is a flow cytometer.

Aspects of the disclosure also include methods for simultaneously measuring scattered light from particles having diameters which differ by 100 nm or more. Methods according to certain embodiments include irradiating a sample having particles which differ by 100 nm or more (e.g., in a flow stream) with a light source and measuring scattered light from the particles of the sample with the subject light detection modules. In some embodiments, methods include characterizing the particles in the sample based on the measured light, such as determining the size of particles in the sample or determining the abundance of particles in the sample having a predetermined size. In certain embodiments, methods further include sorting particles of the sample based on the measured light or characterization of the particles.

Kits including one or more components of the subject light detection modules are also provided. Kits according to certain embodiments, include: a static optical adjustment component, such as a bandpass filter; a variable optical adjustment component, such as a variable neutral density filter or a power beam splitter; and a photodetector. In some embodiments, kits include one or more obscuration components, such as a scatter bar, an obscuration disc, an optical slit or a pinhole. Kits may also include one or more lasers (e.g., continuous wave laser) as well as components of a light beam generator for generating a plurality of frequency-shifted beams of light such as an acousto-optic deflector and direct digital synthesizer.

BRIEF DESCRIPTION OF THE FIGURES

The invention may be best understood from the following detailed description when read in conjunction with the accompanying drawings. Included in the drawings are the following figure:

FIG. 2A depicts an arrangement of a static optical adjustment component, a variable optical adjustment component and a photodetector in a light detection module according to certain embodiments. FIG. 2B depicts an arrangement having a plurality of photodetectors, static optical adjustment components and variable optical adjustment components according to other embodiments.

DETAILED DESCRIPTION

Figure 1:
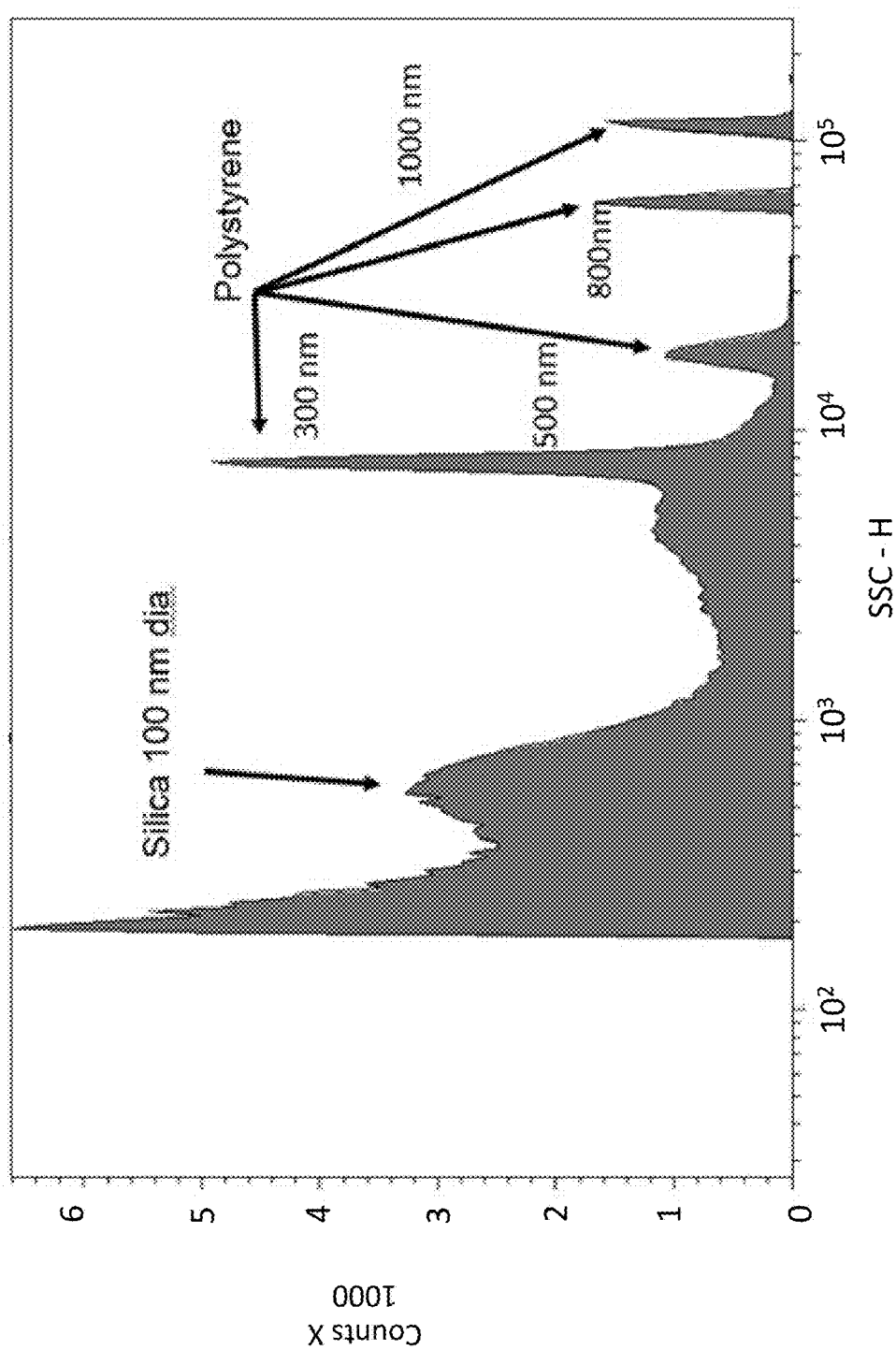
FIG. 1 depicts simultaneous measurement of side scattered light from a sample having particles ranging in diameter of from 100 nm to 1000 nm with light detection modules according to certain embodiments.

Light detection systems for simultaneously measuring scattered light (e.g., in a flow stream) from particles having diameters which differ by 100 nm or more are described. Light detection systems according to certain embodiments include a static optical adjustment component, a variable optical adjustment component and a photodetector. Systems and methods for measuring scattered light from a sample (e.g., in a flow stream) and kits having a static optical adjustment component, a variable optical adjustment component and a photodetector are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention.

The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides light detection modules configured to simultaneously measure scattered light in a flow stream from particles having diameters which differ by 100 nm or more. In further describing embodiments of the disclosure, light detection modules in accordance with embodiments of the invention are described first in greater detail. Next, systems and methods for measuring scattered light from a sample (e.g., in a flow stream) having particles which differ by 100 nm or more are described. Kits having a static optical adjustment component (e.g., a bandpass filter), a variable optical adjustment component (e.g., a variable neutral density filter or a power beam splitter) and a photodetector are also described.

Light Detections Modules

Aspects of the present disclosure include light detection modules configured to simultaneously measure scattered light in a flow stream from particles having diameters which differ by 100 nm or more (e.g., differ by 500 nm or more). The term "simultaneously" is used herein in its conventional sense to refer to detecting scattered light with the photodetectors of the light detection module from particles of different sizes at the same time. In embodiments, the subject light detection modules do not require an adjustment to sensitivity of the photodetectors in order to measure light from the particles of different sizes, where in some instances, there is no adjustment in the voltage gain of the photodetectors in order to measure light from particles having diameters that differ by 100 nm or more. Light detection modules according to certain embodiments include a static optical adjustment component, a variable optical adjustment component and a light scatter detector. In embodiments, the scatter photodetectors may be side scatter photodetectors, forward scatter photodetectors, back scatter photodetectors and combinations thereof. The term "light scatter" is used herein in its conventional sense to refer to the propagation of light energy from particles in the sample (e.g., flowing in a flow stream) that are deflected from the incident beam path, such as by reflection, refraction or deflection of the beam of light. In some embodiments, scattered light is not luminescence from a component of the particle (e.g., a fluorophore). In embodiments, scattered light according to the present disclosure is not fluorescence or phosphorescence. In certain embodiments, scattered light used to determine the size of particles in the flow stream by the subject methods includes Mie scattering by particles in the flow stream. In other embodiments, scattered light used to determine the size of particles in the flow stream by the subject methods includes Rayleigh scattering by particles in the flow stream. In still other embodiments, scattered light used to determine the size of particles in the flow stream by the subject methods includes Mie scattering and Rayleigh scattering by particles in the flow stream.

Light detection modules according to embodiments of the disclosure are configured to simultaneously measure scattered light from particles that differ in size by 100 nm or more. For example, particles in the sample may have diameters which differ by 125 nm or more, such as by 150 nm or more, such as by 175 nm or more, such as by 200 nm or more, such as by 225 nm or more, such as by 250 nm or more, such as by 275 nm or more, such as by 300 nm or more, such as by 325 nm or more, such as by 350 nm or more, such as by 375 nm or more, such as by 400 nm or more, such as by 425 nm or more, such as by 450 nm or more, such as by 475 nm or more, such as by 500 nm or more, such as by 600 nm or more, such as by 700 nm or more, such as by 800 nm or more, such as by 900 nm or more and including by 1000 nm or more. In some embodiments, light detection modules are configured to measure scattered light from a sample having particles with range in diameter from 1 nm to 5000 nm, such as from 5 nm to 2500 nm, such as from 10 nm to 2000 nm, such as from 15 nm to 1500 nm, such as from 20 nm to 1000 nm, such as from 25 nm to 750 nm and including from 50 nm to 500 nm. In other words, as described in greater detail below, the subject light detection modules are capable of simultaneously measuring scattered light from large particles (e.g., particles having a diameter greater than 500 nm) and from small particles (e.g., particles having a dimeter smaller than 100 nm). In some embodiments, light detection modules are capable of simultaneously measuring scattered light from large particles and small particles by amplifying signal from a scatter photodetector with little to no increase in the noise from the scatter photodetector.

FIG. 1 depicts simultaneous measurement of side scattered light from a sample having particles ranging in diameter of from 100 nm to 1000 nm with light detection modules according to certain embodiments. As shown in FIG. 1, light scatter from silica beads having a 100 nm diameter was simultaneously measured with light scatter from polystyrene beads having diameters of 300 nm, 500 nm, 800 nm and 1000 nm.

In certain embodiments, light detection modules are capable of simultaneously measuring scattered light from particles that differ in size by 100 nm or more using only one type of detector channel, such as a side scatter detector channel, such as a forward scatter channel or a back scatter channel. In certain instances, the subject light detection channels are capable of measuring scattered light from particles that differ in size by 100 nm or more using only a single scatter photodetector, such as a single side scatter photodetector, such as a single forward scatter photodetector or a single back scatter photodetector.

In some embodiments, the subject light detection modules are configured to simultaneously measure scattered light from particles that differ in size by 100 nm or more when irradiated with a laser having a power output of 100 mW or less, such as 50 mW or less, such as 25 mW or less, such as 10 mW or less, such as 5 mW or less, such as 1 mW or less, such as 0.5 mW or less and including with a laser having a power output of 0.1 mW or less. In certain embodiments, light detection modules are configured to simultaneously measure scattered light from particles having a diameter of 500 nm or greater and 100 nm or less when irradiated with a laser having a power output of 100 mW or less, such as 50 mW or less, such as 25 mW or less, such as 10 mW or less, such as 5 mW or less, such as 1 mW or less, such as 0.5 mW or less and including with a laser having a power output of 0.1 mW or less. For example, light detection modules may be configured to simultaneously measure scattered light from particles having a diameter of 500 nm or greater and 100 nm or less when irradiated with a laser having a power output of 1 mW or less.

In embodiments, the scattered light propagated to the subject light detection modules from the sample is light that is scattered from the sample at an angle with respect to the incident beam of light irradiation, such as at an angle of 1° or more, such as 10° or more, such as 15° or more, such as 20° or more, such as 25° or more, such as 30° or more, such as 45° or more, such as 60° or more, such as 75° or more, such as 90° or more, such as 135° or more, such as 150° or more and including where the scattered light is propagated from the sample at an angle that is 180° or more with respect to the incident beam of light irradiation. In certain instances, the light detection module is configured to detect side scattered light, such as where the photodetector is positioned to detect scattered light that is propagated from 30° to 120° with respect to the incident beam of light irradiation, such as from 45° to 105° and including from 60° to 90°. In certain instances, the light detection module includes a side scatter photodetector positioned at an angle of 90° with respect to the incident beam of light irradiation. In other instances, the light detection module is configured to detect forward scattered light, such as where the photodetector is positioned to detect scattered light that is propagated from 120° to 240° with respect to the incident beam of light irradiation, such as from 100° to 220°, such as from 120° to 200° and including from 140° to 180° with respect to the incident beam of light irradiation. In certain instances, the light detection module includes a front scatter photodetector positioned to detect scattered light that is propagated at an angle of 180° with respect to the incident beam of light irradiation. In yet other instances, the light detection module is configured to detect back scattered light, such as where the photodetector is positioned to detect scattered light that is propagated from 1° to 30° with respect to the incident beam of light irradiation, such as from 5° to 25° and including from 10° to 20° with respect to the incident beam of light irradiation. In certain instances, the light detection module includes a back scatter photodetector positioned to detect scattered light that is propagated at an angle of 30° with respect to the incident beam of light irradiation.

In embodiments of the present disclosure, light detection modules include a static optical adjustment component and a variable optical adjustment. The term "optical adjustment" is used herein in its convention sense to refer to an optical component that changes or adjusts light that is propagated to the light scatter detector and the brightfield photodetector. For example, the optical adjustment may be to change the profile of the light beam, the focus of the light beam, the direction of beam propagation or to collimate the light beam.

Light detection modules include a static optical adjustment component. The term "static" is used to refer to optics where the optical adjustment of the scattered light is the same for the duration of use of the light detection module. In other words, the adjustment to the light (e.g., change in beam profile, focus, direction, wavelengths, etc.) remains constant and cannot be changed without a physical or computer operated (e.g., when using a digital bandpass filter as described below) change of the static optical adjustment hardware component. In certain embodiments, the static optical adjustment component is configured to provide for static differential obscuration of specific wavelengths of light. By "differential obscuration" is meant that one or more wavelengths of light scattered by particles in the sample is obscured. In some embodiments, the static optical adjustment component is configured to provide for differential obscuration of 1 or more different wavelengths of light scattered by particles in the sample, such as 2 or more different wavelengths, such as 3 or more different wavelengths, such as 4 or more different wavelengths, such as 5 or more different wavelengths, such as 10 or more different wavelengths, such as 15 or more different wavelengths, such as 25 or more different wavelengths, such as 50 or more different wavelengths, such as 100 or more different wavelengths, such as 150 or more different wavelengths, such as 250 or more different wavelengths and including 500 or more different wavelengths of light scattered by particles in the sample. In other embodiments, the static optical adjustment component is configured to provide for differential obscuration of a range of wavelengths, such a range of 5 nm or more, such as 10 nm or more, such as 15 nm or more, such as 25 nm or more, such as 50 nm or more, such as 75 nm or more, such as 100 nm or more, such as 150 nm or more, such as 200 nm or more, such as 250 nm or more and including 300 nm or more. For instance, static optical adjustment components of interest may be configured to provide for differential obscuration of a range of wavelengths of from 2 nm to 500 nm, such as from 3 nm to 450 nm, such as from 4 nm to 400 nm, such as from 5 nm to 350 nm, such as from 10 nm to 300 nm, such as from 15 nm to 250 nm and including from 20 nm to 200 nm. In yet other embodiments, the subject static optical adjustment component is configured to provide for differential obscuration of wavelengths above or below a predetermined wavelength threshold. In one example, wavelengths of light above 800 nm emanating from a sample may be differentially obscured. In another example, wavelengths of light below 400 nm emanating from a sample may be differentially obscured. In certain instances, the static optical adjustment component includes one or more bandpass filters where particular wavelengths, as desired, are differentially obscured. The static optical adjustment component may include two or more different bandpass filters, such as 3 or more, such as 4 or more and including 5 or more different bandpass filters.

In certain embodiments, the static optical adjustment component is a computer operated differential obscuration system, such as those described in U.S. patent application Ser. No. 16/422,630 filed on May 24, 2019, the disclosure of which is herein incorporated by reference.

Light detection modules also include a variable optical adjustment component. The term "variable" is used to refer to optics that are configured to be changed, such as where the optical adjustment can be changed during use of the light detection module. In certain embodiments, the variable optical adjustment component is a neutral density filter. In one example, the neutral density filter is configured to modify the wavelengths of light propagated to the photodetector of the light detection module. For instance, the neutral density filter may be an adjustable filter that obscures 1 or more different wavelengths of light scattered by particles in the sample, such as 2 or more different wavelengths, such as 3 or more different wavelengths, such as 4 or more different wavelengths, such as 5 or more different wavelengths, such as 10 or more different wavelengths, such as 15 or more different wavelengths, such as 25 or more different wavelengths, such as 50 or more different wavelengths, such as 100 or more different wavelengths, such as 150 or more different wavelengths, such as 250 or more different wavelengths and including 500 or more different wavelengths of light scattered by particles in the sample. In other embodiments, the neutral density filter is an adjustable filter that modifies the amount of light that is propagated to the photodetector of the light detection module, such as where the adjustable neutral density filter is configured to reduce the amount of light by 1% or more, such as by 5% or more, such as by 10% or more, such as by 15% or more, such as by 25% or more, such as by 50% or more, such as by 75% or more, such as by 90% or more and including by reducing the amount of light by 95% or more.

In some embodiments, the variable optical adjustment component includes a beamsplitter. The term "beamsplitter" is used herein in its conventional sense to refer to the optical component that is configured to propagate a beam of light along two or more different optical paths, such that a predetermined portion of the light is propagated along each optical path. Any convenient light beamsplitting protocol may be employed such as with triangular prism, slivered mirror prisms, dichroic mirror prisms, among other types of beamsplitters. The beamsplitter may be formed from any suitable material so long as the beamsplitter is capable of propagating the desired amount and wavelengths of light to the light scatter detector and brightfield photodetector. For example, beamsplitters or interest may be formed from glass (e.g., N-SF10, N-SF11, N-SF57, N-BK7, N-LAK21 or N-LAF35 glass), silica (e.g., fused silica), quartz, crystal (e.g., $CaF_2$ crystal), zinc selenide (ZnSe), $F_2$, germanium (Ge) titanate (e.g., S-TIH11), borosilicate (e.g., BK7). In certain embodiments, the beamsplitter is formed from a polymeric material, such as, but not limited to, polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials. In certain embodiments, the beamsplitter is formed from a polyester, where polyesters of interest may include, but are not limited to, poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly(hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly(tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); polyethylene Terephthalate (e.g., Mylar™ Polyethylene Terephthalate), combinations thereof, and the like.

In certain embodiments, the variable optical adjustment component includes a wedged beamsplitter. In these embodiments, the beamsplitter is a beamsplitter having a wedge angle that produces non-collinear back reflection such that propagation of collected light through the wedged beamsplitter results in a small change in the angle of light propagated to one or more of the photodetectors in the light detection module. Wedged beamsplitters according to embodiments of the present disclosure have a wedge angle where a change in the incident angle of collected light results in a deviation in the propagated light angle by 0.001% or more, such as by 0.005% or more, such as by 0.01% or more, such as by 0.05% or more, such as by 0.1% or more, such as by 0.5% or more, such as by 1% or more, such as by 2% or more, such as by 3% or more, such as by 5% or more and including by 10% or more. In some embodiments, the wedged beamsplitter has a wedge angle of from 5 arc minute to 120 arc minute, such as from 10 arc minute to 115 arc minute, such as from 15 arc minute to 110 arc minute, such as from 20 arc minute to 105 arc minute, such as from 25 arc minute to 100 arc minute, such as from 30 arc minute to 105 arc minute, such as from 35 arc minute to 100 arc minute, such as from 40 arc minute to 95 arc minute and including from 45 arc minute to 90 arc minute. In certain embodiments, the wedged beamsplitter has a wedge angle that is sufficient to reduce or eliminate light interference.

In some embodiments, the wedged beamsplitter has a transparency window of from 150 nm to 5 μm; from 180 nm to 8 μm, from 185 nm to 2.1 μm, from 200 nm to 6 μm, from 200 nm to 11 μm, from 250 nm to 1.6 μm, from 350 nm to 2 μm, from 600 nm to 16 μm, from 1.2 μm to 8 μm, from 2 μm to 16 μm or some other wavelength range.

In some embodiments, spatial position of the beamsplitter is adjustable, such as manually (by hand) or with a motor-driven displacement device. For example, the angle of the beamsplitter may be adjusted in the subject light detection system by 5° or more, such as by 10° or more, such as by 15° or more, such as by 20° or more, such as by 30° or more, such as by 45° or more, such as by 60° or more and including by 75° or more. In certain instances, the spatial position of the beamsplitter can be adjusted in the light detection module, such as by 1 mm or more, such as by 5 mm or more, such as by 10 mm or more and including by 25 mm or more. Any convenient motor-driven actuator can be used, such as for example a motor actuated displacement stage, motor driven leadscrew assembly, motor-operated geared actuation device employing a stepper motor, servo motor, brushless electric motor, brushed DC motor, micro-step drive motor, high resolution stepper motor, among other types of motors. In one example, the horizontal or vertical position or the angle of orientation of the beamsplitter can be adjusted with a motor-driven displacement device.

Photodetectors of the subject light detection modules may be any suitable photosensor, such as active-pixel sensors (APSs), avalanche photodiode, image sensors, charge-coupled devices (CCDs), intensified charge-coupled devices (ICCDs), complementary metal-oxide semiconductor (CMOS) image sensors or N-type metal-oxide semiconductor (NMOS) image sensors, light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other types of photodetectors. In embodiments, the light scatter photodetector may include 1 or more photosensor, such as 2 or more, such as 3 or more, such as 5 or more, such as 10 or more and including 25 or more photosensors. In some instances, the light scatter photodetector is a photodetector array. The term "photodetector array" is used in its conventional sense to refer to an arrangement or series of two or more photodetectors that are configured to detect light. In embodiments, photodetector arrays may include 2 or more photodetectors, such as 3 or more photodetectors, such as 4 or more photodetectors, such as 5 or more photodetectors, such as 6 or more photodetectors, such as 7 or more photodetectors, such as 8 or more photodetectors, such as 9 or more photodetectors, such as 10 or more photodetectors, such as 12 or more photodetectors and including 15 or more photodetectors. In certain embodiments, photodetector arrays include 5 photodetectors. The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. The photodetectors in a light scatter photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°.

The light scatter photodetector of the present disclosure are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, the subject photodetectors are configured to measure collected light over a range of wavelengths (e.g., 200 nm-1000 nm). In certain embodiments, detectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. In embodiments, the light detection system is configured to measure light continuously or in discrete intervals. In some instances, detectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some embodiments, light received by the subject light detection module may be conveyed by an optical collection system. The optical collection system may be any suitable light collection protocol that collects and directs the scattered light from the irradiated sample. In some embodiments, the optical collection system includes fiber optics, such as a fiber optics light relay bundle. In other embodiments, the optical collection system is a free-space light relay system.

In embodiments, the optical collection system may be physically coupled to the light detection system, such as with an adhesive, co-molded together or integrated into the light detection system. In certain embodiments, the optical collection system and light detection system are integrated into a single unit. In some instances, the optical collection system is coupled to the light detection system with a connector that fastens the optical collection system to the light detection system, such as with a hook and loop fasteners, magnets, latches, notches, countersinks, counterbores, grooves, pins, tethers, hinges, Velcro, non-permanent adhesives or a combination thereof.

In other embodiments, the light detection module and the optical collection system are in optical communication, but are not physically in contact. In embodiments, the optical collection system may be positioned 0.001 mm or more from the light detection system, such as 0.005 mm or more, such as 0.01 mm or more, such as 0.05 mm or more, such as 0.1 mm or more, such as 0.5 mm or more, such as 1 mm or more, such as 10 mm or more, such as 25 mm or more, such as 50 mm or more and including 100 mm or more from the light detection system.

In certain embodiments, the optical collection system includes fiber optics. For example, the optical collection system may be a fiber optics light relay bundle and light is conveyed through the fiber optics light relay bundle to the light detection system. Any fiber optics light relay system may be employed to propagate light to the light detection system. In certain embodiments, suitable fiber optics light relay systems for propagating light to the light detection system include, but are not limited to, fiber optics light relay systems such as those described in U.S. Pat. No. 6,809,804, the disclosure of which is herein incorporated by reference.

In other embodiments, the optical collection system is a free-space light relay system. The phrase "free-space light relay" is used herein in its conventional sense to refer to light propagation that employs a configuration of one or more optical components to direct light to the light detection system through free-space. In certain embodiments, the free-space light relay system includes a housing having a proximal end and a distal end, the proximal end being coupled to the light detection system. The free-space relay system may include any combination of different optical adjustment components, such as one or more of lenses, mirrors, slits, pinholes, wavelength separators, or a combination thereof. For example, in some embodiments, free-space light relay systems of interest include one or more focusing lens. In other embodiments, the subject free-space light relay systems include one or more mirrors. In yet other embodiments, the free-space light relay system includes a collimating lens. In certain embodiments, suitable free-space light relay systems for propagating light to the light detection system, but are not limited to, light relay systems such as those described in U.S. Pat. Nos. 7,643,142; 7,728,974 and 8,223,445, the disclosures of which is herein incorporated by reference.

Figure 2A:
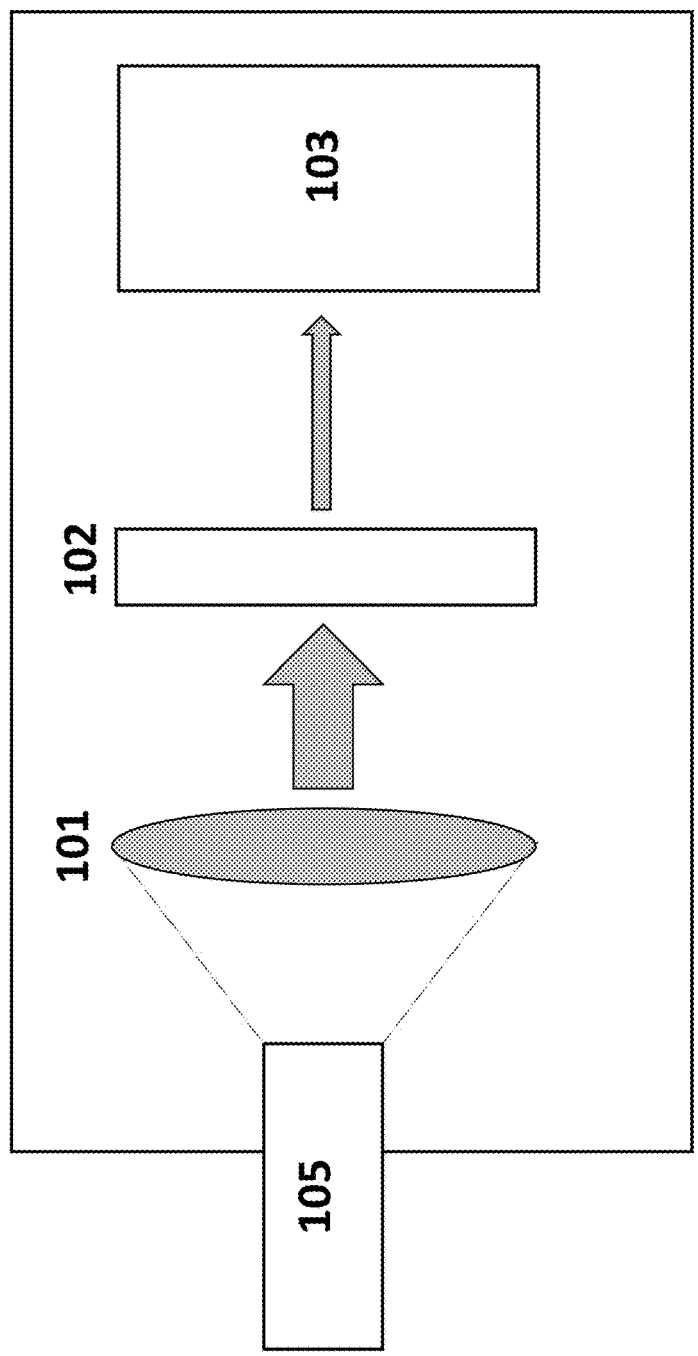
FIGS. 2A and 2B depict configurations for light detection modules according to certain embodiments of the present disclosure.
Figure 2B:
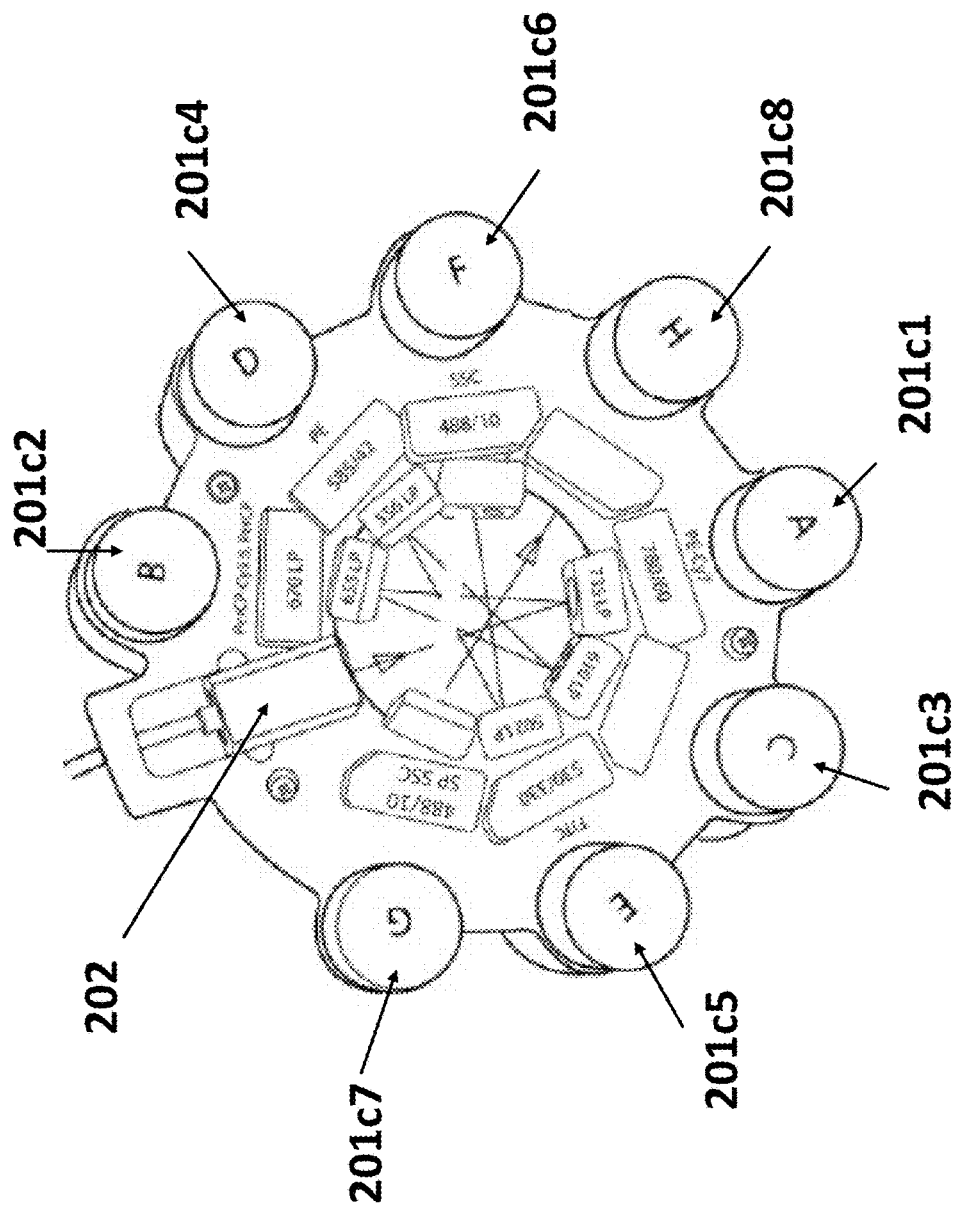

FIGS. 2A and 2B depict example configurations of light detection modules according to certain embodiments. FIG. 2A depicts light detection module 100 where scattered light (e.g., side scattered light, forward scattered light, back scattered light) from an irradiated sample is propagated with optical collection system 105 to static optical adjustment component 101 (e.g., a bandpass filter) and is conveyed through variable optical adjustment component 102 (e.g., a neutral density filter or adjustable beamsplitter) to photodetector 103 (e.g., a photomultiplier tube). FIG. 2B depicts light detection module 200 having eight sets of static optical adjustment components, variable optical adjustment components and photodetectors (201*c*1-201*c*8) are concentrically arranged and light is propagated along a light beam path between each set of static optical adjustment component, variable optical adjustment component and photodetector.

Systems for Measuring Scattered Light from an Irradiated Sample Having Particles of Different Size Aspects of the present disclosure also include systems for measuring light scattered by particles that differ in size by 100 nm or more from a sample (e.g., in the flow stream in a flow cytometer). In certain embodiments, systems include a light source and a light detection module having a static optical adjustment component, a variable optical adjustment component and a photodetector. In certain embodiments, the light detection module is in optical communication with the source of sample (e.g., the flow stream in a flow cytometer) through an optical collection system (e.g., fiber optics or free-space light relay system).

Systems of interest for measuring light scattered by particles that differ in size by 100 nm or more from a sample include a light source. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

In some embodiments, the systems include a laser having a power output of 100 mW or less, such as 50 mW or less, such as 25 mW or less, such as 10 mW or less, such as 5 mW or less, such as 1 mW or less, such as 0.5 mW or less and including with a laser having a power output of 0.1 mW or less. In certain embodiments, systems include a laser having a power output of 1 mW or less.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, CO$_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO4 laser, Nd:YCa4O(BO3)3 laser, Nd:YCOB laser, titanium sapphire laser, thulim YAG laser, ytterbium YAG laser, ytterbium2O3 laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

In certain embodiments, systems further include a flow cell configured to propagate the sample in the flow stream. Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 µm to 20000 µm, such as from 2 µm to 17500 µm, such as from 5 µm to 15000 µm, such as from 10 µm to 12500 µm, such as from 15 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be 1 µL/min or more, such as 2 µL/min or more, such as 3 µL/min or more, such as 5 µL/min or more, such as 10 µL/min or more, such as 15 µL/min or more, such as 25 µL/min or more, such as 50 µL/min or more and including 100 µL/min or more, where in some instances the rate of sample conveyed to the flow cell chamber by the sample injection port is 1 µL/sec or more, such as 2 µL/sec or more, such as 3 µL/sec or more, such as 5 µL/sec or more, such as 10 µL/sec or more, such as 15 µL/sec or more, such as 25 µL/sec or more, such as 50 µL/sec or more and including 100 µL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 µL/sec or more, such as 50 µL/sec or more, such as 75 µL/sec or more, such as 100 µL/sec or more, such as 250 µL/sec or more, such as 500 µL/sec or more, such as 750 µL/sec or more, such as 1000 µL/sec or more and including 2500 µL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for detecting light from the sample in the flow stream. In some instances, the rate of sample flow in the flow cell is 1 µL/min (microliter per minute) or more, such as 2 µL/min or more, such as 3 µL/min or more, such as 5 µL/min or more, such as 10 µL/min or more, such as 25 µL/min or more, such as 50 µL/min or more, such as 75 µL/min or more, such as 100 µL/min or more, such as 250 µL/min or more, such as 500 µL/min or more, such as 750 µL/min or more and including 1000 µL/min or more. For example, the system may include a pump that is configured to flow sample through the flow cell at a rate that ranges from 1 µL/min to 500 µL/min, such as from 1 uL/min to 250 uL/min, such as from 1 uL/min to 100 uL/min, such as from 2 µL/min to 90 µL/min, such as from 3 µL/min to 80 µL/min, such as from 4 µL/min to 70 µL/min, such as from 5 µL/min to 60 µL/min and including rom 10 µL/min to 50 µL/min. In certain embodiments, the flow rate of the flow stream is from 5 µL/min to 6 µL/min.

In certain embodiments, the subject systems are flow cytometric systems employing the above described light detection modules for detecting light scattered by particles in the sample in a flow stream. In certain embodiments, the subject systems are flow cytometric systems. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5):502-11; Alison, et al. *J Pathol*, 2010 December; 222(4):335-344; and Herbig, et al. (2007) *Crit Rev Ther Drug Carrier Syst*. 24(3): 203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject systems are particle sorting systems, such those described in U.S. Pat. Nos. 10,006,852; 9,952,076; 9,933,341; 9,784,661; 9,726,525; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804;

6,372,506; 5,700,692; 5,643,796; 5,627,040; 5,620,842; 5,602,039; the disclosure of which are herein incorporated by reference in their entirety.

In certain instances, the subject systems are flow cytometry systems that are further configured for imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

Methods for Measuring Light from an Irradiated Sample Having Particles of Different Size Aspects of the disclosure also include methods for simultaneously measuring scattered light from particles having diameters which differ by 100 nm or more. Methods according to certain embodiments include irradiating a sample having particles which differ by 100 nm or more (e.g., in a flow stream) with a light source and measuring scattered light from the particles of the sample with a light detection module as described above. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the flow stream with one or more lasers. As discussed above, the type and number of lasers will vary depending on the sample as well as desired light collected and may be a pulsed laser or continuous wave laser. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

In some embodiments, methods include irradiating the sample with a laser having a power output of 100 mW or less, such as 50 mW or less, such as 25 mW or less, such as 10 mW or less, such as 5 mW or less, such as 1 mW or less, such as 0.5 mW or less and including irradiating the sample with a laser having a power output of 0.1 mW or less. In certain embodiments, methods include irradiating the sample with a laser having a power output of 1 mW or less.

The sample may be irradiated with one or more of the above-mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

As discussed above, in embodiments light from the irradiated sample is conveyed to a light detection module as described herein and measured by one or more of the photodetectors. In practicing the subject methods, light is propagated to the light detection module. The light is further propagated to the light scatter detector and the brightfield photodetector through the optical adjustment component. In some embodiments, methods include measuring the collected light over a range of wavelengths (e.g., 200 nm-1000 nm). For example, methods may include collecting spectra of light over one or more of the wavelength ranges of 200 nm-1000 nm. In yet other embodiments, methods include measuring collected light at one or more specific wavelengths.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

In some embodiments, methods include further adjusting the light before measuring the light with the subject light detection modules. For example, the light from the sample source may be passed through one or more lenses, mirrors, pinholes, slits, gratings, light refractors, and any combination thereof. In some instances, the collected light is passed through one or more focusing lenses, such as to reduce the profile of the light directed to the light detection system or optical collection system as described above. In other instances, the emitted light from the sample is passed through one or more collimators to reduce light beam divergence conveyed to the light detection system.

In certain embodiments, methods include irradiating the sample with two or more beams of frequency shifted light. As described above, a light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

Kits

Aspects of the invention further include kits, where kits include a light scatter photodetector, a static optical adjustment component (e.g., one or more bandpass filters), a variable optical adjustment component (e.g., a neutral density filter or an adjustable beamsplitter). Kits may further include other optical adjustment components as described here, such as obscuration components including optical apertures, slits and obscuration discs and scatter bars. Kits according to certain embodiments also include optical components for conveying light to the light scatter photodetectors, such as collimating lenses, mirrors, wavelength separators, pinholes, etc. Kits may also include an optical collection component, such as fiber optics (e.g., fiber optics relay bundle) or components for a free-space relay system. In some instances, kits further include one or more photodetectors, such as photomultiplier tubes (e.g., metal package photomultiplier tubes). In certain embodiments, kits include one or more components of a light beam generator, such as a direct digital synthesizer, an acousto-optic deflector, a beam combining lens and a Powell lens.

In some instances, the kits can include one or more assay components (e.g., labeled reagents, buffers, etc., such as described above). In some instances, the kits may further include a sample collection device, e.g., a lance or needle configured to prick skin to obtain a whole blood sample, a pipette, etc., as desired.

The various assay components of the kits may be present in separate containers, or some or all of them may be pre-combined. For example, in some instances, one or more components of the kit, e.g., two or more light scatter photodetectors are present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject light detection systems find use where the characterization of a sample by optical properties, in particular where identification and differentiation of cells in a sample, is desired. In some embodiments, the systems and methods described herein find use in flow cytometry characterization of biological samples. In certain embodiments, the systems and methods find use in spectroscopy scattered light. Embodiments of the present disclosure find use where enhancing the effectiveness of measurements in flow cytometry are desired, such as in research and high throughput laboratory testing. The present disclosure also finds use where it is desirable to provide a flow cytometer with improved cell sorting accuracy, enhanced particle collection, reduced energy consumption, particle charging efficiency, more accurate particle charging and enhanced particle deflection during cell sorting.

The present disclosure also finds use in applications where cells prepared from a biological sample may be desired for research, laboratory testing or for use in therapy. In some embodiments, the subject methods and devices may facilitate the obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A light detection module configured to simultaneously measure scattered light in a flow stream from particles having diameters which differ by 100 nm or more, wherein the light detection module comprises:
   a static optical adjustment component;
   a variable optical adjustment component; and
   a photodetector.

2. The light detection module according to claim 1, wherein the light detection module is configured to simultaneously measure scattered light in a flow stream from particles having diameters which differ by 500 nm or more.

3. The light detection module according to claim 1, wherein the light detection module is configured to measure one or more of side scattered light and forward scattered light from the particles in the flow stream.

4. The light detection module according to claim 1, wherein the light detection module is configured to simultaneously measure scattered light from the particles in the flow stream irradiated with a low power light source.

5. The light detection module according to claim 4, wherein the light source is a low power laser.

6. The light detection module according to claim 5, wherein the light source is a laser having a peak power output of 1 mW or less.

7. The light detection module according to claim 1, wherein the static optical adjustment component comprises a bandpass filter.

8. The light detection module according to claim 1, wherein the variable optical adjustment component comprises a variable neutral density filter.

9. The light detection module according to claim 1, wherein the variable optical adjustment component comprises a power beam splitter.

10. The light detection module according to claim 9, wherein the light detection module comprises a plurality of power beam splitters and a plurality of photodetectors.

11. The light detection module according to claim 1, wherein the photodetector comprises a photomultiplier tube.

12. A system comprising:
a light source; and
a light detection module configured to simultaneously measure scattered light in a flow stream from particles having diameters which differ by 100 nm or more, wherein the light detection module comprises:
a static optical adjustment component;
a variable optical adjustment component; and
a photodetector.

13. The system according to claim 12, wherein the light detection module is configured to simultaneously measure scattered light in a flow stream from particles having diameters which differ by 500 nm or more.

14. The light detection module according to claim 12, wherein the light detection module is configured to measure one or more of side scattered light and forward scattered light from the particles in the flow stream.

15. The light detection module according to claim 12, wherein the light source is a low power light source.

16. The system according to claim 15, wherein the light source is a low power laser.

17. The system according to claim 16, wherein the light source is a laser having a peak power output of 1 mW or less.

18. The system according to claim 12, wherein the static optical adjustment component comprises a bandpass filter.

* * * * *